2,713,597

SEPARATION OF DIISOPROPYLAMINE FROM ISOPROPYL ALCOHOL

Harold I. Yalowitz and William J. Bannister, Terre Haute, Ind., assignors to Commercial Solvents Corporation, Terre Haute, Ind., a corporation of Maryland No Drawing. Application August 29, 1951, Serial No. 244,254

7 Claims. (Cl. 260—583)

The present invention relates to a method for separating diisopropylamine from mixtures comprising diisopropylamine and isopropyl alcohol. More particularly, it pertains to the separation of diisopropylamine from mixtures thereof with isopropyl alcohol by a method which comprises washing with water to remove the isopropyl alcohol.

In the production of diisopropylamine by reacting isopropyl alcohol with ammonia, for example, or by hydrogenating a mixture of isopropylamine and acetone, the product always contains an appreciable proportion of isopropyl alcohol. Separation of the diisopropylamine from the isopropyl alcohol cannot be accomplished by direct fractional distillation, owing to the small difference between the boiling points of the two compounds (83.7 and 82.4° C., respectively).

Prior investigators, being aware of the impossibility of separating diisopropylamine from isopropyl alcohol by direct distillation, have devised various methods for the accomplishment of the separation. The first of these methods, described and claimed in U. S. Patent No. 2,348,683, involves the addition of water to the mixture containing the isopropyl alcohol and diisopropylamine, and the removal of the diisopropylamine from such mixture in the form of a constant boiling mixture with the water, leaving the isopropyl alcohol as a residue of the distillation. That procedure was not entirely satisfactory, and it was pointed out in U. S. Patent 2,512,584 that the distillation of the mixture with water to separate the diisopropylamine-water azeotrope does not effect a satisfactory separation of the amine from the alcohol, but gives instead a distillate consisting ordinarily of 83% diisopropylamine, 12% water, and 5% isopropyl alcohol. The latter patent discloses an improved process for isolating diisopropylamine, in which water and an inert organic liquid, such as benzene, are added to the mixture of diisopropylamine and isopropyl alcohol, and a heterogeneous azeotrope containing isopropyl alcohol in both phases is fractionally distilled. U. S. Patent No. 2,512,585, describes a similar process, except that the use of water is omitted. The methods of these two patents, using benzene as the inert organic liquid, have given excellent results and are the most efficient methods heretofore known for the separation of diisopropylamine and isopropyl alcohol. Some objections, however, have been made to the addition of a new constituent to the mixture of diisopropylamine and isopropyl alcohol, and particularly to the addition of benzene. These objections are based on the supplementary distillations required to remove the benzene, and to the precautions required in handling benzene. Regardless of the particular organic liquid employed, the heterogeneous azeotrope method is subject to the major disadvantage that the distillation is time consuming and that considerable quantities of heat are required for the distillation.

We have now discovered a superior process for separating diisopropylamine and isopropyl alcohol, in which the mixture is washed with water, the water layer containing isopropyl alcohol is then separated, and the washed oil layer containing diisopropylamine and water is distilled to remove dissolved water. With mixtures of diisopropylamine and isopropyl alcohol containing a very small proportion of isopropyl alcohol we have found that a single washing, under the conditions to be described in detail below, is sufficient to remove practically all of the alcohol. However, with larger proportions of alcohol in the mixture, such as usually results from production of diisopropylamine, several successive washes with water are necessary to remove practically all of the isopropyl alcohol. Successive washings can be accomplished as a series of independent steps, or preferably by continuous counter-current methods which have the effect of separate washings. For example, excellent results are obtained when the mixture of diisopropylamine and isopropyl alcohol is passed counter-current to water in a column packed to give efficient mixing of the two streams. The most efficient removal of isopropyl alcohol from the mixture with diisopropylamine has been accomplished by counter-current washing of the mixture in a Scheibel column (U. S. Patent 2,493,265). In the Scheibel column there are alternate regions of good agitation and of comparative calm which allow a washing action comparable to several successive passes through an ordinary scrubber.

The ratio of wash water to the mixture of diisopropylamine and isopropyl alcohol to be used depends on the composition of the mixture. That is, the ratio of water to mixture increases as the isopropyl alcohol content of the mixture increases. For a mixture containing about 20% isopropyl alcohol we have found that a water ratio of about 5 to 1 should be employed. Our new process cannot be expected to work efficiently in cases where the alcohol content is much higher than 20% because of the increasing solubility of the amine in the higher concentrations of the alcohol. This is not considered a serious disadvantage, however, inasmuch as the mixtures resulting from the usual methods for the preparation of diisopropylamine generally contain much less than 20% isopropyl alcohol.

The temperature at which washing occurs can be controlled by providing heating means for the washing vessel, or preferably by preheating the mixture of diisopropylamine and isopropyl alcohol and the water prior to mixing. We have found that the efficiency of isopropyl alcohol removal increases as the temperature increases. At atmospheric pressure the temperature must not, however, be permitted to rise above about 74° C., at which point a diisopropylamine-water azeotrope boils. Very efficient separation occurs, without the concurrent danger of the said azeotrope forming, if the temperature is maintained within the range of about 50°–60° C. The lower temperature limit at which the process can be carried out varies with the amount of isopropyl alcohol present in the mixture, and with the amount of water added. Thus, with no alcohol present, the lower limit for separation of water and diisopropylamine is about 28° C., regardless of the amount of water present. For separation of the isopropyl alcohol from an anhydrous mixture containing about 86% diisopropylamine and about 14% isopropyl alcohol, if about 0.7 volume of water for each volume of mixture is added, separation does not occur until the mixture has been heated to about 50° C. If about 1.4 volumes of water are added to one volume of mixture, separation starts at about 32° C., where a small amount of oil containing diisopropylamine separates. At 40° C. the amount of amine oil becomes much larger and at 60° is still greater. Since the diisopropylamine oil layer which separates may still contain some isopropyl alcohol, the desirability of operating with more water and at higher temperatures is apparent, except that the amount of water should not be so great as to make impractical the recovery of amine and alcohol from the water layer.

After washing the mixture of diisopropylamine and isopropyl alcohol with water, whether by a batch or continuous process, two phases separate, the heavier phase containing essentially water and isopropyl alcohol and a lighter oil phase containing essentially diisopropylamine with small quantities of dissolved water. It is then necessary to distill the washed oil layer to separate the water. This distillation is accomplished by known means.

The following examples are given to illustrate our invention, and are not to be construed as limiting it to the exact materials, steps, or conditions described:

*Example I*

A batch of crude diisopropylamine, containing 800 grams of diisopropylamine, 81 grams of isopropyl alcohol and 141 grams of water, was prepared. These proportions gave a mixture containing 78.3% diisopropylamine, 7.9% isopropyl alcohol, and 13.8% water. The extractor used in this experiment consisted of a Berle saddle-pack column which was heated to a temperature of about 64° C. by means of hot methanol vapors refluxing through an outer jacket. Water, preheated to 65° C. was charged to the top of the column, and the crude diisopropylamine was introduced at the bottom. Orifices calibrated to deliver 25 ml. per minute in air were used to control the input of both crude diisopropylamine and water. The washed diisopropylamine oil was removed from the top of the column by means of a syphon operated under a slight but continuous vacuum. The spent wash water was allowed to drip continuously from the bottom of the column into a receiver at a roughly constant rate equal to the flow of the fresh water.

The washed diisopropylamine oil phase was then distilled through a Fenske column of 12 theoretical plates packed with single turn glass helices and equipped with a decanter head which was held at 30–40° C. An azeotrope came over at vapor temperature of 72–75° C. and separated into two layers in the decanter. The lower (water) layer was drawn off while the upper (diisopropylamine oil) layer was refluxed back to the column. When the water layer no longer formed, the decanter head was removed and was replaced with a partial take-off head. Distillation was continued at a 10 to 1 reflux ratio until a vapor temperature of 82° C. was reached. The resulting distillate was the wet diisopropylamine fraction. Further distillation removed the dry diisopropylamine fraction at a vapor temperature of 82–84° C.

The spent wash water from the counter-current washing step, which contained some dissolved diisopropylamine, was distilled through the Fenske column under a 10 to 1 reflux ratio to remove the 72–78° fraction. Additional diisopropylamine was thus concentrated in this fraction.

Five separate runs by the above method gave dry diisopropylamine fractions analyzing 99–100% pure diisopropylamine. With recycling of the diisopropylamine fraction from the spent wash water and the water layer from the distilled diisopropylamine oil the total recovery of substantially pure diisopropylamine averaged about 83%.

*Example II*

In this experiment the extraction was carried out in a Scheibel column, a cylindrical tube with a 2-inch diameter and an overall length of 47 inches. The column had seven regions of calm packed with stainless steel wire mesh each 4 inches high alternating with 6 regions of agitation each 0.75 inch high. Agitation was provided by stainless steel blades on a shaft which ran through the length of the column. The shaft was driven by a variable speed electric motor. Above and below the packing were four inch spaces which acted as settling pools.

A batch of crude diisopropylamine was prepared containing 270 grams of isopropyl alcohol, 390 grams water and 2400 grams diisopropylamine. The crude was heated to 50° C. by a preheater and entered the column near the bottom through an orifice calibrated to deliver 26 ml. per minute in air. The water was preheated to 70–75° C. and was introduced near the top through an orifice calibrated to deliver 60 ml. per minute in air. The agitation rate was set at 300 R. P. M. The oil-water interface was maintained slightly above the level of the incoming water with a resulting washed oil temperature of 58–60° C. at the outlet. The washed oil was sent through a separator and the continuous overflow was collected. The spent wash water was continuously drawn off at the bottom of the column at a rate approximately equal to the water input.

The washed oil was distilled through a glass-packed Fenske column equipped with a decanter head. The distillate in the decanter was maintained at temperatures somewhat greater than 30° C. The upper (oil) layer was refluxed back to the column and the lower (water) layer was drawn off. This distillation was continued until a homogeneous mixture formed in the decanter. The decanter was then drained to a pot and was replaced with a partial take-off head. Distillation was then continued at a 10 to 1 reflux ratio and a 72–78° C. fraction (wet diisopropylamine) was removed. The residue was transferred to simple Kjeldahl type distillation equipment and was distilled until only a very small amount of residue was left. The spent wash water was distilled through a glass-packed Fenske column of 12–15 theoretical plates at a 10 to 1 reflux ratio to remove the fraction which came over at a vapor temperature range of 72–78° C. (wet diisopropylamine).

Five runs by the above procedure gave dry diisopropylamine fractions of a purity of 99–100%. With recycling as in Example II, a recovery averaging about 90% of substantially pure diisopropylamine was obtained.

*Example III*

A 1,000 gram sample of crude diisopropylamine was prepared having the composition: 80% diisopropylamine, 7% isopropyl alcohol and 13% water. This sample was mixed with one liter of water to form a homogeneous solution at 26° C. The mixture with water was then heated to 70° C. and the two layers which formed on heating were separated at about 65° C. The oil layer was then mixed with one liter of water, heated to 70° C. as before, and the two layers again separated at about 65° C. The oil layer was then fractionally distilled to separate the dissolved water. A 523 gram portion of diisopropylamine analyzing 99.6% pure was thus obtained. Additional substantially pure diisopropylamine was recovered from the water layers from the washing steps.

We claim:
1. In the separation of diisopropylamine from mixtures containing diisopropylamine and isopropyl alcohol, the process which comprises washing said mixture with water at a temperature between about 28° and 74° C. at which isopropyl alcohol separates from diisopropylamine, separating the water layer containing isopropyl alcohol which forms, and distilling the washed oil layer to obtain a substantially pure diisopropylamine fraction.

2. In the separation of diisopropylamine from mixtures containing diisopropylamine and less than about 20% isopropyl alcohol, the process which comprises washing the mixture with water at a temperature between about 28° and 74° C. at which isopropyl alcohol separates from diisopropylamine, separating the water layer containing isopropyl alcohol which forms, and distilling the washed oil layer to obtain a substantially pure diisopropylamine fraction.

3. In the separation of diisopropylamine from mixtures containing diisopropylamine and isopropyl alcohol, the process which comprises contacting said mixture with water at a temperature between 28° and 74° C. at which isopropyl alcohol separates from diisopropylamine to dissolve said isopropyl alcohol in the water, removing the water containing isopropyl alcohol, and distilling the wet diisopropylamine remaining to obtain a substantially pure diisopropylamine fraction.

4. In the separation of diisopropylamine from mixtures containing diisopropylamine and isopropyl alcohol, the process which comprises washing the mixture with water at a temperature between about 28° and 74° C. at which isopropyl alcohol separates from diisopropylamine, separating the water layer containing isopropyl alcohol and diisopropylamine which forms, distilling said water layer to remove the water and isopropyl alcohol as an azeotrope, and distilling the washed oil layer containing predominantly diisopropylamine to obtain a substantially pure diisopropylamine fraction.

5. In the separation of diisopropylamine from mixtures containing diisopropylamine and isopropyl alcohol, the process which comprises washing the mixture with water at a temperature within the range of about 50-60° C., separating the water layer containing isopropyl alcohol which forms, and distilling the washed oil layer to obtain a substantially pure diisopropylamine fraction.

6. In the separation of diisopropylamine from mixtures containing diisopropylamine and isopropyl alcohol, the process which comprises washing the mixture with water, in the proportion of less than about five volumes of water per volume of mixture, at a temperature between about 28° and 74° C. at which isopropyl alcohol separates from diisopropylamine, separating the water layer containing isopropyl alcohol which forms, and distilling the washed oil layer to obtain a substantially pure diisopropylamine fraction.

7. In the separation of diisopropylamine from mixtures containing diisopropylamine and isopropyl alcohol, the process which comprises intimately contacting a stream of the mixture with a stream of water at a temperature between 28 and 74° C. at which isopropyl alcohol separates from diisopropylamine, withdrawing a water phase containing predominantly isopropyl alcohol and an oil layer containing predominantly diisopropylamine, and distilling said oil layer to obtain a substantially pure diisopropylamine fraction.

References Cited in the file of this patent
UNITED STATES PATENTS

| | | |
|---|---|---|
| 2,206,585 | Spence | July 2, 1940 |
| 2,237,628 | Olin et al. | Apr. 8, 1941 |
| 2,348,683 | McKenna | May 9, 1944 |
| 2,527,017 | Luten, Jr., et al. | Oct. 24, 1950 |
| 2,568,522 | Steitz, Jr., et al. | Sept. 15, 1951 |

OTHER REFERENCES

Handbook of Chem. and Physics, 27th ed. Copyright 1943 by Chem. Rubber Pub. Co.; pp. 744 and 848.